March 22, 1932.  B. BORLAND  1,850,825
SEAL
Filed May 19, 1930
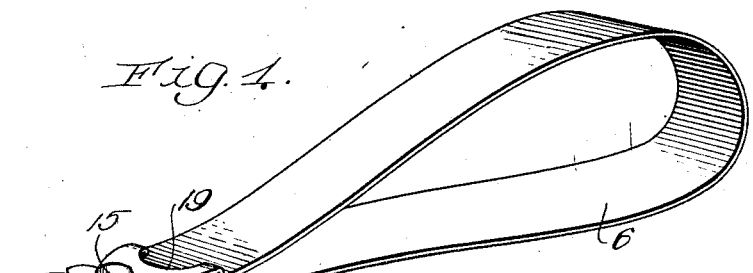
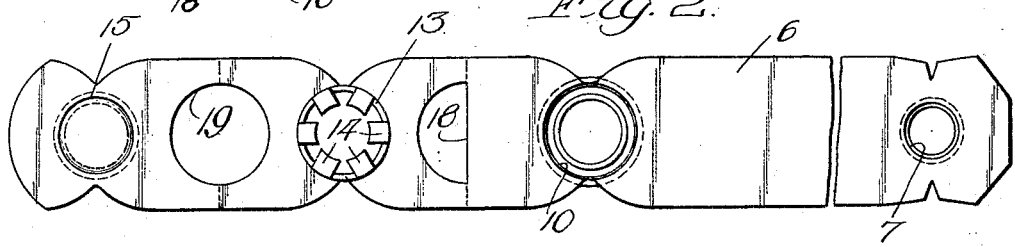
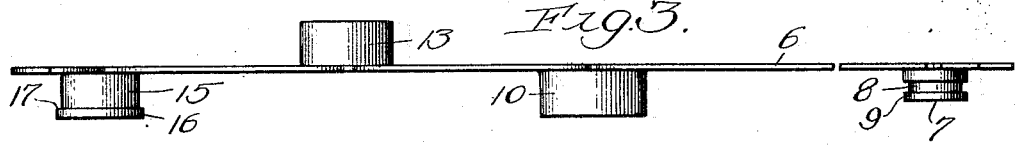
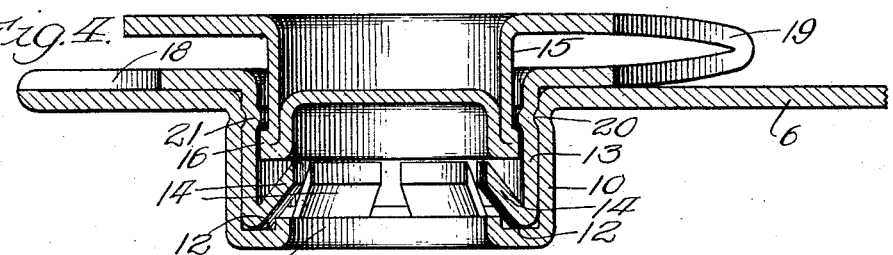
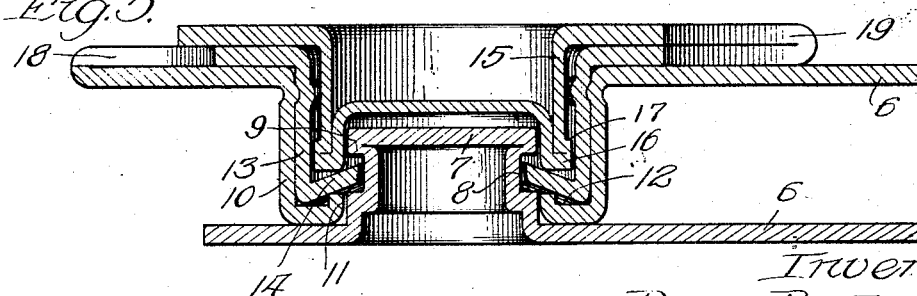
Inventor:
Bruce Borland
By Glenn S. Noble Atty.

Patented Mar. 22, 1932

1,850,825

UNITED STATES PATENT OFFICE

BRUCE BORLAND, OF CHICAGO, ILLINOIS

SEAL

Application filed May 19, 1930. Serial No. 453,780.

This invention relates to seals of the type commonly known as car seals and particularly seals of this kind which are self locking, or have automatic locking means, as distinguished from those closed by means of a press. These seals are usually made of strips of comparatively light tin or metal approximately three-eighths of an inch wide and it has been found difficult to provide integrally formed locking means which is satisfactory for commercial use but such means is provided in accordance with the present invention.

The objects of this invention are to provide an improved seal having means whereby the locking portions may be locked or fastened without the use of a press; to provide a seal having locking or fastening means which may be fastened and when so fastened cannot be separated without destroying the locking means; to provide a seal having a grooved locking button on one portion thereof and a plurality of locking teeth or prongs on another portion thereof which are adapted to engage with the groove to fasten the parts together and having means coacting with the locking teeth or prongs to cause them to engage with the groove and means to protect the same after they have been brought into engagement or locking position; to provide an improved car seal of the character set forth; and to provide such other advantages and improvements in construction as will appear more fully in the following description.

In the accompanying drawings illustrating this invention;

Figure 1 is a perspective view of a seal in locked position;

Figure 2 is an extended or plan view showing the partially formed seal;

Figure 3 is a side view;

Figure 4 is a sectional view on an enlarged scale showing the locking or fastening parts in position for closing the seal; and Figure 5 is a view similar to Figure 4, showing the parts in closed or locked position.

In the particular form of seal as shown in these drawings, the seal strap or strip 6 which is formed of tin or other suitable material is provided with an integrally formed hollow button or stud 7 which has a peripheral groove 8 and an outwardly projecting flange or end 9 which provides a shoulder for the engaging or locking members.

The strip 6 is provided at a distance from the button 7 with an integrally formed hollow projection or case 10. The end of this projection has a central aperture which is defined by an inwardly projecting flange 11 thereby forming an annular seat or groove 12. Another hollow projection or cylinder 13 is made on the opposite side of the strip 6 at a short distance from the case 10. The end of this projection is punched or cut away to form an annular series of locking tongues or pawls 14 which are bent inwardly or toward the adjacent portion of the strip as indicated in Figure 4. These teeth preferably extend inwardly or toward the center a short distance beyond the periphery of the hole 11 and are adapted to engage with the groove 8 in the button 7.

The strip 6 is also provided with a third hollow projection or cup 15 in alinement with the projections 10 and 13 and extending on the same side of the strip as the projection 10. This cup has a closed end or bottom and is provided with an outwardly extending ring or flange 16 thereby forming an abutment 17 adjacent to the end. The seal is completed by bending the strip 6 and interlocking or nesting the hollow projections as shown in Figure 4. In order to facilitate the bending of the strip at the proper points between these projections I provide a semi-circular hole 18 between the projections 10 and 13 and a circular hole 19 between the projections 13 and 15. When the cylinder 13 is nested in the case 10, the locking teeth or pawls 14 may rest against the inner end of the flange 11, the ends of these teeth preferably being tapered to facilitate their catching in the groove of the locking button. The cup or projection 15 is nested in the cylinder 13 so that the flanged inner end is adjacent to, or in engagement with, the teeth 14. When the parts are in this position the walls of the case 10 are pressed inwardly to form an annular bead 20 which is forced into the wall of the cylinder 13 making an annular inwardly projecting bead or bulge 21 which extends inwardly a sufficient distance to engage with the abutment 17 and prevent the withdrawal of the cup 15.

When the seal is to be closed or locked, the operator presses the case 10 down over the button 8 and pinches the parts together so that the lower end of the case will engage with the surface of the strip 6, as shown in Figure 5. When the parts are in the position as shown in Figure 4, it will be seen that the cup 15 has not fully entered the cylinder but the end thereof is somewhat above the ends of the teeth 14. As the parts are pinched together, the cup 15 slides downwardly in the cylinder 13 until the end engages with the teeth and forces them into the groove 8 as clearly shown in Figure 5. When in this position the teeth prevent any substantial longitudinal movement of the button 7 with respect to the case 10 and the ends of the seal are firmly held together. The cup 15 and adjacent portions of the strip at the base thereof prevent access to the locking parts and the cup cannot be withdrawn on account of the bead or bulge 21. When the seal is broken, the break will usually occur adjacent to the fastening members so that the parts cannot be again fastened without indicating that the seal has been broken.

Modifications may be made in the details of construction or arrangement of the parts in order to provide seals for different purposes and therefore I do not wish to be limited to the particular construction herein shown and described except as set forth in the following claims in which I claim:

1. A seal comprising a strip having a flanged projection thereon, fastening members spaced from the projection and adapted to coact therewith to close the seal, independent means for forcing the fastening members into engagement with the flanged projection and means for protecting the fastening members from tampering.

2. A seal comprising a strip of suitable material having a fastening button with an annular abutment, a cylindrical projection spaced from the button and having integrally formed radially arranged fastening teeth for engagement with the abutment on the button, integrally formed means for enclosing the teeth and independent means separate from the teeth adapted to coact with said teeth to move them into fastening position.

3. A seal comprising a strip having an integrally formed button with a peripheral groove, an integrally formed case spaced from the button and having an upwardly projecting flange in the end thereof, a cylindrical projection adapted to be nested in the case and having inwardly projecting fastening members adapted to engage with said flange, a cup formed integrally with the strip and having an outwardly extending flange at the end thereof, said cup fitting in the cylindrical projection with its end arranged to engage with the fastening teeth, said case and cylindrical projection having interlocking means for holding them together and means for preventing the withdrawal of the cup, the arrangement being such that when the case is brought into engagement with the button and the parts pressed together, the teeth will be forced into locking position in the groove in said button.

4. A seal comprising a strip of tin or the like having an integrally formed cylindrical projection with radially arranged locking members in the end thereof, integrally formed hollow projections arranged adjacent to the cylindrical projection and adapted to be nested, one inside of the cylindrical projection and the other outside of the cylindrical projection, means for holding said projections in nested position and an integrally formed button spaced from said projections and adapted to fit within the same and to be held in position by said locking members, said projection which is nested inside of the cylindrical projection serving as a means for forcing the locking members into locking position.

5. A seal comprising a metal strip having an integrally formed button with a peripheral groove at one end thereof, an integrally formed case spaced from the button and having an upwardly extending flange surrounding a hole in the end thereof, a cylindrical projection fitting in the case, said strip being bent to permit such engagement, said cylindrical projection having laterally arranged locking teeth projecting at an angle from the end thereof, an integrally formed closed cup having a flanged end adapted to fit loosely in the cylindrical projection, said strip being bent to permit the cup to enter the projection, means for fastening the cylindrical projection in the case, and means adapted to engage with the flange of the cup to prevent its removal from the cylindrical projection, the arrangement being such that when the button is brought into engagement with the case and parts pressed together the end of the cup will force the teeth into the peripheral groove in the button to lock the parts together.

6. A seal comprising a metallic strip having a flanged projection thereon, locking members on the strip at a distance from said projection and adapted to coact therewith to lock the seal and independent means separate from the locking members for forcing the locking members into engagement with the flanged projection after said projection is in locking position.

BRUCE BORLAND.